United States Patent [19]
Shirochi et al.

[11] Patent Number: 5,510,900
[45] Date of Patent: Apr. 23, 1996

[54] VIDEO SIGNAL RECORDING APPARATUS WITH RERECORDING INHIBIT CIRCUIT

[75] Inventors: Yoshiki Shirochi, Chiba; Keitaro Yamashita, Tokyo, both of Japan

[73] Assignee: Sony Corporation, Tokyo, Japan

[21] Appl. No.: 178,467

[22] Filed: Jan. 6, 1994

Related U.S. Application Data

[63] Continuation of Ser. No. 910,410, Jul. 8, 1992, abandoned.

[30] Foreign Application Priority Data

Jul. 29, 1991 [JP] Japan ..................... 3-211525

[51] Int. Cl.$^6$ ................. H04N 5/76; G11B 15/04; G11B 19/04
[52] U.S. Cl. ............................ 358/335; 360/60
[58] Field of Search ..................... 358/335, 310, 358/906; 360/60, 33.1, 35.1; 380/5, 20, 7; H04N 5/76, 9/79, 5/92, 5/225

[56] References Cited

U.S. PATENT DOCUMENTS

| | | |
|---|---|---|
| 4,100,575 | 7/1978 | Morio et al. . |
| 4,163,253 | 7/1979 | Morio et al. . |
| 4,700,221 | 10/1987 | Yamamoto et al. ............. 358/906 |
| 4,775,901 | 10/1988 | Nakano . |
| 4,777,526 | 10/1988 | Saitoh et al. ................... 358/86 |
| 4,864,614 | 9/1989 | Crowther ........................ 358/86 |
| 4,884,151 | 11/1989 | Ohtsu et al. .................... 358/906 |
| 4,907,093 | 3/1990 | Ryan . |
| 5,130,813 | 7/1992 | Oie et al. ....................... 358/906 |
| 5,130,815 | 7/1992 | Silverman et al. .............. 358/335 |
| 5,134,496 | 7/1992 | Schwab et al. ................. 360/60 |
| 5,162,922 | 11/1992 | Takemura et al. .............. 358/335 |
| 5,177,618 | 1/1993 | Dunlap et al. .................. 358/335 |
| 5,189,691 | 2/1993 | Dunlap ........................... 358/335 |

*Primary Examiner*—Thai Q. Tran
*Attorney, Agent, or Firm*—William S. Frommer; Alvin Sinderbrand

[57] ABSTRACT

A picture signal recording system comprises a high-definition broadcasting station 1, an artificial satellite 2, a television receiver 3 and a video signal recording apparatus 5. A pilot signal P is superimposed on a luminance signal Y at the broadcasting station 1. This pilot signal P does not give any adverse influence to an image reproduced on a TV monitor and is detectable from the luminance signal Y. A frequency of this pilot signal is selected to be smaller than the frequency of the luminance signal Y, a superimposing timing thereof is set to a head position of the luminance signal Y, and an amplitude thereof is varied with respect to a grey level as a variation center. The pilot signal P superimposed on the luminance signal Y is detected by a pilot signal detecting circuit 53 within a video signal recording apparatus 5. The picture signal is recorded on a video tape 11 and rerecording prohibit information is recorded in a reserved area by a picture signal recording process circuit 51. When the video tape 11 on which this rerecording prohibit information has been recorded is reproduced, the reproduced picture signal is prohibited to be rerecorded.

8 Claims, 4 Drawing Sheets

VIDEO SIGNAL RECORDING APPARATUS WITH RERECORDING INHIBIT CIRCUIT

This application is a continuation of application Ser. No. 07/910,410, filed Jul. 8, 1992, now abandoned.

BACKGROUND OF THE INVENTION

1. Field of the Invention

The present invention generally relates to a picture signal recording system. More specifically, the present invention is directed to such a picture signal recording system for prohibiting and lawfully permitting duplication (dubbing) of a picture signal, namely for permitting only recording of a live broadcasting picture signal, or only a first recording operation of a signal from a cassette tape.

2. Description of the Prior Art

As a method for prohibiting illegal duplication of a picture signal recorded on a video tape, it has been proposed that an antipiracy signal is assembled in a synchronization signal portion in, for instance, a commercial purpose VTR, which indicates that such a signal duplication is prohibited.

However, the method for assembling the antipiracy signal into the synchronization signal portion has such a problem that this antipiracy signal is readily released by substituting this synchronization signal portion by another synchronization signal portion.

Another method for prevent illegal duplication of a picture signal has been proposed that an antipiracy signal having a frequency higher than the frequency band of the picture signal is superimposed on the picture signal. This method has few problem that a quality of an image reproduced at a TV monitor apparatus is deteriorated, since the antipiracy signal is present at the frequency region higher than the frequency region higher than the frequency band of the picture signal. However, this method can prevent effectively such an illegal duplication by employing a lowpass filter having a simple circuit arrangement to easily remove the antipiracy signal.

Although many other conventional duplication preventing methods have been proposed, no effective method has been proposed without deteriorating the quality of the reproduced image when the picture signal is reproduced under the normal mode.

The applicants of the present invention have been considered the above-described problems, and have provided a picture signal process apparatus for superimposing such an antipiracy signal on a picture signal, which can be hardly removed or canceled, without substantially deteriorating image qualities of the reproduced picture signal in the high-definition television monitor.

The picture signal process apparatus according to the present invention is particularly to prohibit that a picture signal is rerecorded from one video tape to another video tape. In other words, the rerecording operation between the video apparatuses is prohibited.

In these picture signal process apparatuses, the frequency "$f_{AP}$" of the antipiracy signal is set to have a frequency interleave relationship with respect scanning to the horizontal scanning frequency "$f_H$" to defined the horizontal synchronization. The antipiracy signal owns the above-described frequency relationship with the horizontal scanning frequency, and a detectable amplitude to prohibit illegal duplication, and also an amplitude having a level lower than the level at which the reproduced image is not practically deteriorated in the TV monitor apparatus.

As previously stated, even when such an antipiracy signal having the frequency $f_{AP}$ with the frequency interleave relationship with the frequency $f_H$, and having the above-described amplitude range is superimposed on the picture signal, there is no practically adverse influence in the reproduced image of the TV screen.

However, there is another problem in an effective operation of a video apparatus if the recording operation to the recording medium such as video tapes is continuously prohibited. In other words, in addition to the above-described method for completely prohibiting the duplication from the video tape, there is specific case that only one recording operation is permitted.

For instance, there is such a need that although a live picture signal having a high image quality of a high-definition television broadcasting system may be once recorded on a video tape, when the picture signal dubbing from this recorded video tape is prohibited, a content of a cassette tape is once permitted to be recorded on the video tape, but the rerecording operation of the contents of this video tape is prohibited.

There is neither an apparatus, or a system capable of satisfying the above-described need in prior art.

Therefore, the present invention has an object to provide a picture signal recording system capable of satisfying such a need.

SUMMARY OF THE INVENTION

To solve the above-described problems, according to a first mode of the present invention;

a picture, signal recording system including a broadcasting station, a receiver for receiving a picture signal from the broadcasting station, and a picture signal recording apparatus for recording the picture signal from the receiver, is characterized by comprising:

means for superimposing on a picture signal, a pilot signal indicating that a recording operation of said picture signal is allowed only once, employed in said broadcasting station, a broadcasting software signal, or the receiver. The picture signal recording apparatus including means for detecting said pilot signal by inputting the picture signal on which said pilot signal has been superimposed, and means for recording said picture signal on a recording medium and a signal for indicating that a rerecording operation is prohibited, at a predetermined region of said recording medium when said pilot signal is detected.

In accordance with a second mode of the present invention, a picture signal recording system is characterized by comprising:

a cassette tape forming apparatus having means for recording in a predetermined region of a cassette tape on which a picture signal is recorded, a pilot signal for allowing that said picture signal is recorded only one time; and a picture signal recording apparatus having means for detecting said pilot signal from a cassette tape on which said pilot signal has been recorded, and means for recording the picture signal recorded on said cassette tape on a recording medium and a signal for indicating that a recording operation is prohibited, at a predetermined region of said recording medium when said pilot signal is detected.

In the first mode of the present invention, the live picture signal broadcasted from the television broadcasting system is once recorded on the recording medium such as the video tape in the picture signal recording apparatus. However, the picture signal recorded by the picture signal recording apparatus cannot be rerecorded from this recording medium to other recording materials. As a consequence, multiple illegal duplication can be prohibited.

According to the second mode of the present invention, although a picture signal can be only once recorded from a cassette tape to a recording medium such as a video tape, when the picture signal has been once recorded on the recording medium, this picture signal recorded on the recording medium is prohibited to be rerecorded to other recording mediums, so that the multiple illegal dubbing can be prohibited.

BRIEF DESCRIPTION OF THE DRAWINGS

The above-described object and other novel and useful features of the present invention will become more readily apparatus in the following description considered in connection with the accompanying drawings, in which.

DETAILED DESCRIPTION OF THE PREFERRED EMBODIMENTS

Figure 1:
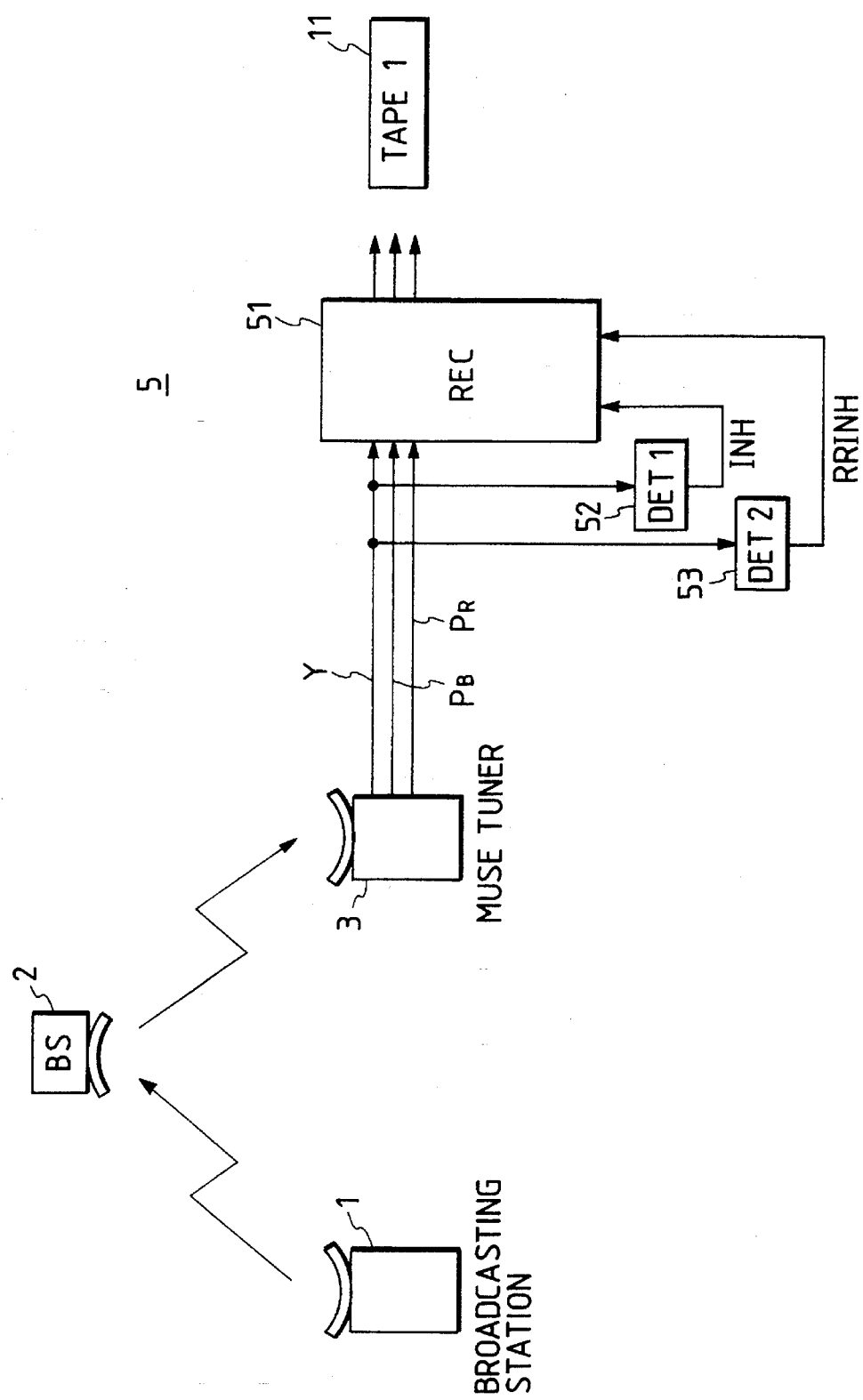
FIG. 1 is a schematic diagram of a picture signal recording system according to a first preferred embodiment of the present invention.

In FIG. 1, there is shown a constructive diagram for a high-definition television broadcasting system and a picture signal recording system thereof as a picture signal recording system according to a first preferred embodiment of the present invention.

This picture signal recording system is so constructed that a MUSE signal as a picture signal or a video signal is transmitted from a high-definition television broadcasting station 1 to an artificial satellite 2, the MUSE signal is again sent from the satellite 2 to a MUSE tuner 3 (or, a high-definition television receiver 30), and this MUSE signal is received by the TV (television) signal 3 to be converted into an HD signal, and thus, the high-definition broadcasting program is recorded by a video signal recording apparatus 5.

It should be noted that since an audio (voice) signal has no direct relation to the present invention, only a picture signal will be described in the following description.

The television receiver 3 is so arranged that not only a high-definition television program may be observed by a user (TV watcher), but also since an output signal of this television receiver 3 is connected to the video signal recording apparatus 5, the high-definition television program is recorded on a video tape 11 as a recording medium in the video signal recording apparatus 5.

With respect to a live picture signal broadcasted from a high-definition television broadcasting station 1, a pilot signal superimposing apparatus (not shown) is employed in the high-definition television broadcasting station 1 so as to permit only a single recording operation in the video signal recording apparatus 5. It should be noted that when such a pilot signal has been previously entered in a software, no pilot signal superimposing apparatus is required in the broadcasting station.

Figure 2:
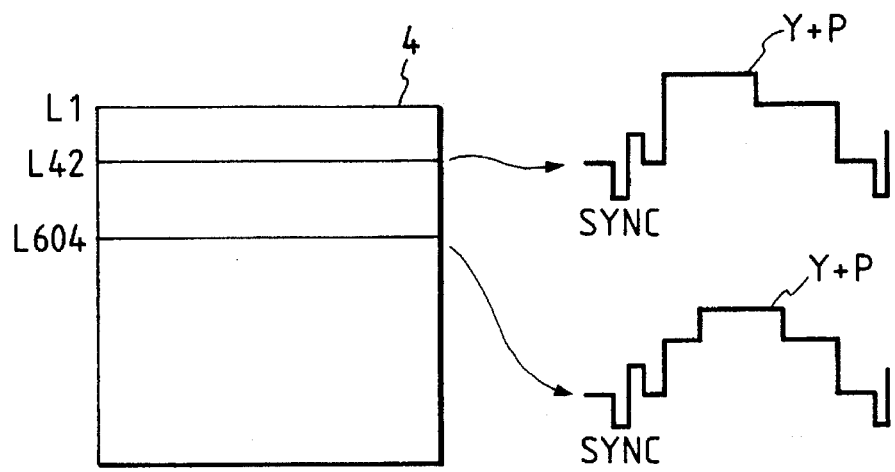
FIG. 2 schematically represents a position of a pilot signal superimposed on a picture signal in the broadcasting station shown in FIG. 1 in case of a second mode.

FIG. 2 represents a position where the pilot signal has been superimposed in case of a second mode. In this example, in a frame of a high-definition television broadcasting signal, a pilot signal "P" is superimposed on a luminance signal "Y" at both of a position of a line L1 (MUSE line number 47) and a position of a line L604 (MUSE line 609). These lines are located at a head position of a block position where 516 luminance signals are inserted.

The frequency $f_{AV}$ of the antipiracy signal for prohibiting the rerecording operation between the video apparatuses in the above-described prior art has been set with having a frequency interleaving relationship with the horizontal relationship with the horizontal scanning frequency "$f_H$", or has been set to such a frequency easily produced from the internal clock frequency of 44.55 MHz. However, since there are some possibilities that the pilot signal "P" superimposed on the luminance signal "Y" is mixed with the rerecording prohibit signal and the discrimination between these signals is required, the frequency "$f_p$" of the pilot signal is different from the frequency $f_{AP}$ of the antipiracy signal for prohibiting the rerecording operation between the video apparatuses in this preferred embodiment.

On the other, since the frequency $f_p$ of the pilot signal may be arbitrarily superimposed by the high-definition television broadcasting station 1 in accordance with a first mode of this preferred embodiment, this frequency may be selected to be an arbitrary frequency different frequency $f_{AP}$ of the rerecording prohibit signal between the video apparatus.

This pilot signal frequency "$f_p$" may be selected to be approximately 5.6 MHz two times higher than the frequency $f_{AP}$ of antipiracy signal for prohibiting the rerecording operation between the video apparatuses. Alternatively, since any signal process is performed when this frequency is selected to be 4 MHz in the MUSE broadcasting system, this pilot signal frequency is selected to be 1.400625 MHz which is 41.5 times higher than the horizontal frequency at the lower frequency side of the MUSE broadcasting picture signal.

Also, a pilot signal "P" in case of a second mode, which is superimposed on a picture signal is selected to be such a simple signal that is not present in the nature world, and has a fixed pattern that is not conspicuous when this pilot signal is reproduced on a TV screen. A level of this pattern is varied within a small discriminatable range with respect to a gray level as a center thereof, for instance, is varied in ±0.1 V at a center of 0.5 V.

It should be noted that the above-described pilot signal may be superimposed on the MUSE signal before or after being converted into the HD signal in the TV receiver 3, instead of the high-definition broadcasting station 1.

In other words, the superimposition of the pilot signal "P" to the picture signal may be performed before the pilot signal is entered into the video signal recording apparatus 5. Also, the pilot signal "P" may be utilized in the first mode, second mode, or a combined mode thereof.

The luminance signal Y, a first color difference signal $P_B$, and a second color difference signal $P_R$ are outputted from the TV receiver 3 to the video signal recording apparatus 5 as the picture signals. In this preferred embodiment, the pilot signal P is superimposed on only the luminance signal Y among these picture signals.

It should also be noted that the pilot signal P may be superimposed on the first color difference signal $P_B$, the second color difference signal $P_R$, or all picture signals, instead of the luminance signal Y.

The video signal recording apparatus 5 comprises a picture signal recording process circuit 51, a first pilot signal detecting circuit 52, and a second pilot signal detecting circuit 53. The video signals are recorded on a picture signal recording video tape 11. While the luminance signal Y, first color difference circuit $P_B$ and second color difference circuit $P_R$ are recorded on the picture signal recording tape 11 in the picture signal recording process circuit 51, a detection is done in the first pilot signal detecting circuit 52 whether or not a rerecording prohibit signal (will be discussed later) is contained in the luminance signal Y.

If the rerecording prohibit signal is superimposed on the luminance signal, a record prohibit signal "INH" is outputted from the first pilot signal detecting circuit 52 to the picture signal recording process circuit 51, so that the recording operation of the picture signal is prohibited. It should be understood in this example that since no rerecording prohibit signal is superimposed on the luminance signal inputted from the TV receiver 3, the recording prohibit signal INH is outputted to the picture signal recording process circuit 51.

Upon detection of the pilot signal superimposed on the luminance signal Y, the second pilot signal detecting circuit 53 outputs a rerecording prohibit detecting signal "RRINH". Since the pilot signal "P" is superimposed on the luminance signal derived from the TV receiver 3, the rerecording prohibit detecting signal RRINH is outputted to the picture signal recording process circuit 51. In this case, the picture signal recording process circuit 51 records the luminance signal Y, first color difference signal $P_B$, and second color difference signal $P_B$ on the picture signal recording video tape 11, and also records a signal indicative of rerecording prohibition based on the rerecording prohibit detecting signal RRINH.

Figure 3:
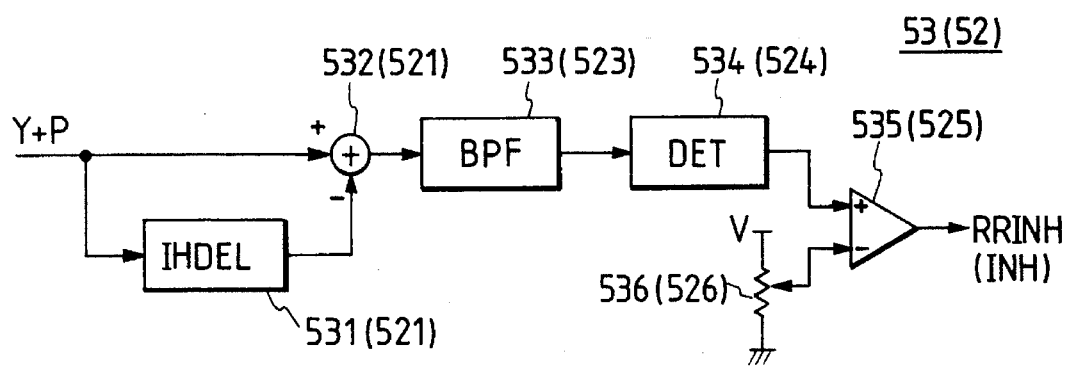
FIG. 3 is a circuit diagram for detecting a pilot signal in the picture signal recording apparatus of FIG. 1.

In FIG. 3, there is shown a detailed circuit diagram of the second pilot signal detecting circuit 53. This second pilot signal detecting circuit 53 constitutes a comb type filter circuit arranged by a 1-H delay circuit 531, a signal adding circuit 532 and a bandpass filter 533, and is designed to selectively detect the frequency $f_p$.

The second pilot signal detecting circuit 53 further includes a detecting circuit 534 so as to detect a signal having a frequency corresponding to the frequency $f_p$ of the pilot signal P, and a comparing circuit 535 and also a reference voltage generating resistor 536. In this comparing circuit 535, a reference voltage produced from the reference voltage generating resistor 536 is compared with a detecting signal, and when a signal level of the pilot signal is greater than a predetermined level, the above-described rerecording prohibit detecting signal RRINH is outputted from this comparing circuit 535.

Figure 4:
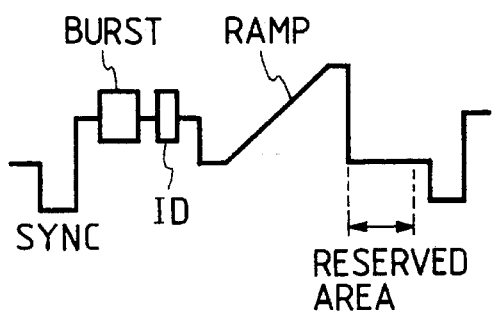
FIG. 4 schematically shows an arrangement of a video tape signal recorded by the picture signal recording apparatus shown in FIG. 1.

When the rerecording prohibit detecting circuit RRING is inputted into the video signal recording process circuit 51, this video signal recording process circuit 51 records the picture signal on the picture signal recording part of the picture signal recording video tape 11, and also records thereon a signal indicative of the rerecording operation at a reserved area as shown in FIG. 4.

It should be noted that the reserved area shown in FIG. 4 is defined as an empty area after the ramp signal "RAMP" succeeding to the synchronizing signal SYNC, burst signal BURST and identification signal ID in the picture signal recording region. That is to say, the reserved area corresponds to an unused portion of a recording area where the ramp signal RAMP is recorded which is used to correct linearity of the video signal recorded on the video tape.

Figure 5:
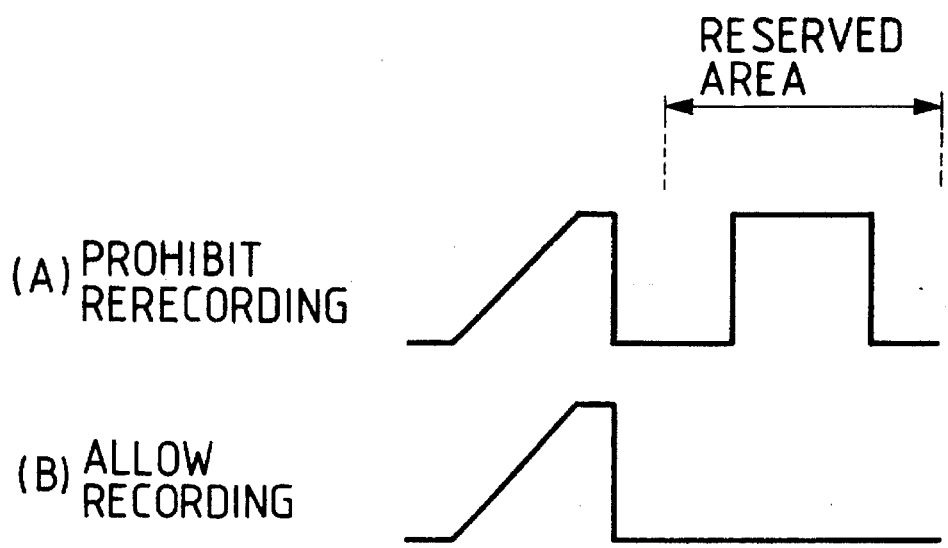
FIG. 5 represents waveforms of rerecording prohibit signal recorded on a reserved area by the picture signal recording apparatus shown in FIG. 1.

FIG. 5 represents an example of a signal waveform for showing the above-described rerecording prohibit operation. FIG. 5A indicates such a condition that data on a logic "1" is recorded an the reserved area, and thus the rerecording operation is prohibited, whereas FIG. 5B shows such a condition that no data is recorded on the reserved area and thus the rerecording operation is not prohibited.

In this preferred embodiment, when the rerecording prohibit detecting signal RRINH is outputted from the second pilot signal detecting circuit 53, the picture signal recording process circuit 51 records the data representative of the prohibited rerecording operation shown in FIG. 5A on the reserved area.

With the above-described operation, the picture signal inputted into the video signal recording apparatus 5 via the TV receiver 3 has been recorded on the picture signal recording video tape 11.

In this preferred embodiment, when the rerecording prohibit detecting signal RRINH is outputted from the second pilot signal detecting circuit 53, the picture signal recording process circuit 51 records the data representative of the prohibited rerecording operation shown in FIG. 5A on the reserved area.

With the above-described operation, the picture signal inputted into the video signal recording apparatus 5 via the TV receiver 3 has been recorded on the picture signal recording video tape 11.

Figure 6:
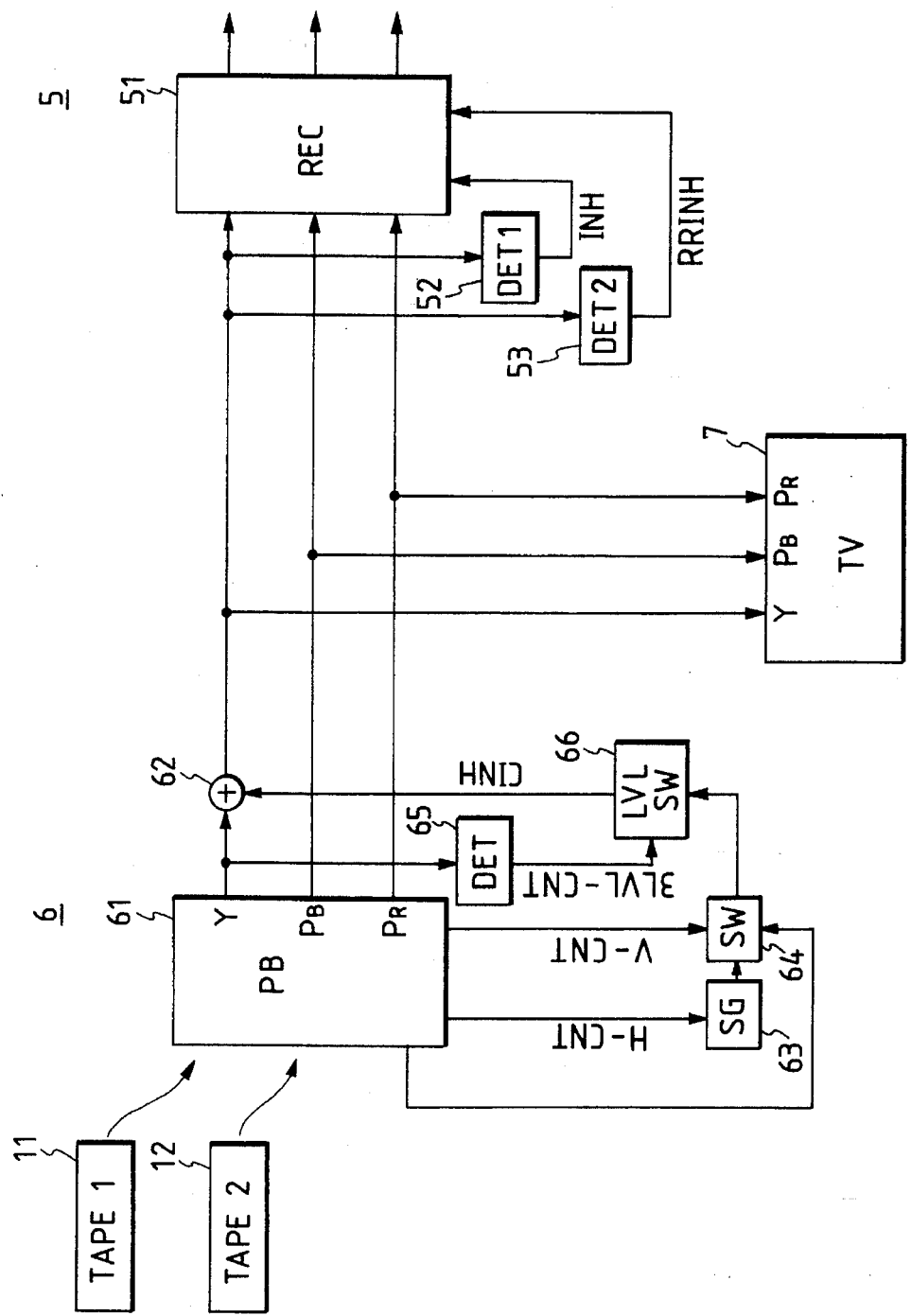
FIG. 6 is a schematic block diagram for showing an arrangement of a picture signal recording system according to a second preferred embodiment of the present invention.

Thus, the picture signal recorded on the picture signal recording video tape 11 is reproduced on the TV monitor 7. A system arrangement for rerecording this picture signal by the video signal recording apparatus 5 is shown in FIG. 6.

A video signal reproducing apparatus 6 comprises a video signal reproducing circuit 61, a signal adding circuit 62, a recording prohibit signal generating circuit 63, a switching circuit 64, a synchronizing signal detecting circuit 65, and a level switching circuit 66.

The video signal reproducing circuit 61 reproduces the picture signal recorded on the picture signal recording video tape 11 loaded thereon to output the luminance signal Y, first color difference signal $P_B$ and second color difference signal $P_R$.

Since the circuitry defined from the signal adding circuit 62 to the level switching circuit 66 performs a signal process operation for the picture signal recording cassette tape 12, a circuit operation thereof will be described later.

When the picture signal reproduced in the video signal reproducing circuit 61 is inputted into the TV monitor 7, an image is reproduced in response to the reproduced picture signal. As previously described, the pilot signal "P" superimposed on the luminance signal "Y" never causes any deterioration, or any practical influence to the reproduced image displayed on the TV monitor 7. This is because the pilot signal is superimposed on only the first line of the luminance signal, the frequency $f_p$ of the pilot signal is selected to be 1.400625 MHz which is 41.5 times greater than the horizontal frequency "$f_H$" at the lower band of the MUSE broadcasting signal, and the pilot signal is such a simple signal that does not exist in the natural field, and owns a fixed and not conspicuous pattern when being reproduced at the TV screen. In other words, the level of the pilot signal is varied within a small discriminatable range with respect to a grey level as a center, for instance, varied ±0.1 V at a 0.5 V center.

On the other hand, when the above-described reproduced picture signal is inputted into the video signal recording apparatus 5, the first pilot signal detecting circuit 52 detects the rerecording prohibit signal recorded on the reserved area, and outputs the recording prohibit signal INH to the picture signal recording process circuit 51. As a consequence, the picture signal reproduced from the picture signal recording video tape 11 is not recorded in the picture signal recording process circuit 51.

Referring now to FIG. 6, a picture signal recording system according to a second preferred embodiment of the present invention will be described.

In the picture signal recording system of the second preferred embodiment, although a first recording operation of a picture signal recorded on the picture signal recording cassette tape 12 is permitted to the picture signal recording video tape 11, the video signal which has been once recorded on the video signal recording video tape 11 is prohibited to be rerecorded on any recording materials, similar to that of the first preferred embodiment.

Figure 7:
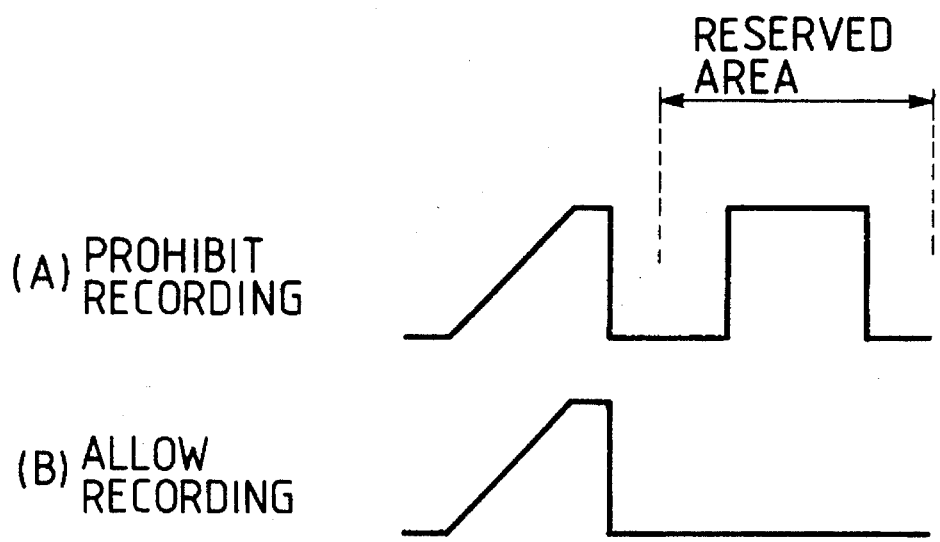
FIG. 7 shows a waveform of a rerecording prohibit signal employed in the second preferred embodiment.

A picture signal has been previously recorded on the picture signal recording cassette tape 12 in a cassette tape forming apparatus (not shown). At this time, either a recording prohibit signal is recorded on the reserved area of the picture signal recording tape 12, or a recording allow signal is only once recorded thereon (see FIG. 7).

This copy control signal may be recorded on an index region other than the reserved area.

Also, the picture signal from the picture signal recording cassette tape 12 is reproduced in the video signal reproducing circuit 61.

At this time, the copy control signal recorded on the service area or the index region is outputted to the switching circuit 64 to control an output signal flow from the recording prohibit signal generating circuit 63. In response to the horizontal synchronizing signal, the recording prohibit signal generating circuit 63 generates another pilot signal "P" having a frequency and an amplitude variation equivalent to those of the pilot signal "P" employed in the above-described high-definition television broadcasting station 1, or the TV receiver 3.

When the copy control signal reproduced in the video signal reproducing circuit 61 corresponds to the signal for allowing only one recording operation, the switching circuit 64 outputs the pilot signal "P" from the recording prohibit signal generating circuit 63 to a level switching circuit 66 in response to the vertical synchronization controlling signal V-CNT and the recording allow signal.

A synchronization signal detecting circuit 65 detects a triple-value synchronizing signal SYNC and outputs a timing detection signal thereof to the level switching circuit 66. In response to the timing when the luminance signal Y is detected, the pilot signal "P" from the recording prohibit signal generating circuit 63 passes through the level switching circuit 66 at the timing when the pilot signal is located at the reserved area. This pilot signal P is added (superimposed) to the luminance signal Y in the signal adding circuit 62.

The picture signal reproduced from the picture signal recording cassette tape 12 may be reproduced on the TV monitor 7 without any problem and any deterioration in the reproduced image, which is similar to the above-described preferred embodiment.

On the other hand, the luminance signal Y on which the pilot signal P has been superimposed is detected by a second pilot signal detecting circuit 53 employed in the video signal recording apparatus 5, and the rerecording prohibit detecting signal RRINH is outputted.

Also a first reproducing signal about the picture signal recorded on the picture signal recording cassette tape 12 is recorded on the picture signal recording video tape 11, which is similar to that of the previous embodiment. Then, the rerecording prohibit signal is recorded on the reserved area of this picture signal recording video tape 11 and the second and subsequent recording operations are prohibited.

It should be noted that when the first pilot signal detecting circuit 52 shown in FIGS. 1 and 6 is used to prohibit dubbing of the video tapes between the video apparatuses, on which the antipiracy signal having the frequency "$f_{AP}$" with the frequency interleave relationship to the first pilot signal, the circuit arrangement of the first pilot signal detecting circuit 52 may be made by combining a comb type filter circuit with a detecting/level judging circuit which are similar to the second pilot signal detecting circuit 53 as shown in FIG. 3.

In this case, basically, only a frequency characteristic of a bandpass filter 523 corresponding to the bandpass filter 533 is different therefrom.

It should also be noted that a circuit (not shown) for detecting the antipiracy signal and for prohibiting an illegal dubbing may be furthermore employed in addition to the first pilot signal detecting circuit 52 and the second pilot signal detecting circuit 53.

In this case, in the picture signal recording system according to the present invention, various recording prohibit modes may be provided:

(a). Although a live picture signal from a high-definition television broadcasting system may be once recorded on the picture signal recording video tape 11, this picture signal cannot be rerecorded from this picture signal recording video tape 11 to any other recording materials.

(b). Although a picture signal may be once recorded from the picture signal recording cassette tape 12 to the picture signal recording video tape 11, the picture signal cannot be rerecorded from the picture signal recording video tape 11 to any other recording materials.

(c). No picture signal can be recorded from the video tape on which the antipiracy signal has been superimposed.

To embody the present invention, various modifications other than the above-described preferred embodiments may be performed.

For instance, such an inventive idea that the first broadcasting picture signal recording operation is allowed and the rerecording operation of the picture signal is prohibited, which has been described with reference to FIG. 1, may be applied not only to a high-definition television broadcasting system, but also a normal broadcasting television system.

As previously described in detail, in accordance with the present invention, although a live picture signal of a television broadcasting system may be only once recorded on a recording medium such as a video tape, after the picture signal has been recorded on the recording medium, this picture signal is not longer rerecorded from this recording medium to any other recording mediums. As a consequence, a plurality of illegal dubbing operations can be prohibited. However, since the live picture signal can be recorded, it is possible to use the picture signal recording apparatus similar to the conventional picture signal recording apparatus.

Furthermore, according to the present invention, there is another advantage that although a picture signal reproduced from a cassette tape may be only once recorded on a recording medium, the picture signal cannot be rerecorded from this recording medium to any other recording medium.

What is claimed is:

1. A video signal recording apparatus which inhibits the rerecording of a video signal, comprising:

receiving means for receiving the video signal with a first or a second inhibit recording signal superimposed thereon;

means for producing said second inhibit recording signal in response to reception of said first inhibit recording signal superimposed on said video signal, said second inhibit recording signal being distinguished from said first inhibit recording signal;

means for recording said video signal and for recording said second inhibit recording signal with said video signal when said first inhibit recording signal is received superimposed on said video signal; and means for inhibiting rerecording of said video signal by said means for recording when said video signal is received with said second inhibit recording signal by said receiving means.

2. The video signal recording apparatus according to claim 1, wherein said receiving means receives said video signal from a broadcast station.

3. The video signal recording apparatus according to claim 1, wherein said receiving means receives said video signal from a video signal reproducing circuit.

4. The video signal recording apparatus according to claim 1, wherein said second inhibit recording signal is recorded at a predetermined reserved portion of the video signal, said predetermined reserved portion being after a synchronizing signal, a burst signal, an identification signal and a ramp signal of the video signal.

5. The video signal recording apparatus according to claim 4, wherein said second inhibit recording signal is a predetermined voltage magnitude representing a logic "1" in said predetermined reserved portion of the video signal.

6. The video signal recording apparatus according to claim 1, wherein said second inhibit recording signal is recorded at a predetermined unused reserved portion of the video signal, said predetermined unused reserved portion being after a synchronizing signal, a burst signal, an identification signal and a ramp signal of the video signal.

7. The video signal recording apparatus according to claim 1, wherein said means for recording includes:

a first detector for detecting said first inhibit recording signal :superimposed on said video signal and for supplying a first prohibit control signal when said first inhibit recording signal is detected, and a second detector for detecting said second inhibit recording signal superimposed on said video signal and for supplying a second prohibit control signal when said second inhibit recording signal is detected; and wherein said means for recording records said second inhibit recording signal with said video signal when said first prohibit control :signal is supplied by said first detector, and said means for inhibiting rerecording inhibits rerecording of said video signal by said means for recording when said second prohibit control signal is supplied by said second detector.

8. The video signal recording apparatus according to claim 1, wherein said means for recording is a recorder.

* * * * *